(12) United States Patent
Beedle et al.

(10) Patent No.: US 8,998,292 B2
(45) Date of Patent: Apr. 7, 2015

(54) FRONT AIR DAM FOR TRUCK

(71) Applicants: Russell S Beedle, LaSalle (CA); William J Elder, Belle River (CA)

(72) Inventors: Russell S Beedle, LaSalle (CA); William J Elder, Belle River (CA)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/939,626

(22) Filed: Jul. 11, 2013

(65) Prior Publication Data
US 2014/0015277 A1    Jan. 16, 2014

Related U.S. Application Data

(60) Provisional application No. 61/670,153, filed on Jul. 11, 2012.

(51) Int. Cl.
*B62D 35/00* (2006.01)
*B60R 19/00* (2006.01)

(52) U.S. Cl.
CPC ........... *B62D 35/001* (2013.01); *Y10S 180/903* (2013.01)

(58) Field of Classification Search
CPC .......................... B62D 35/001; B62D 35/005
USPC ................... 296/180.1, 180.2; 293/120, 121; 180/903
See application file for complete search history.

(56) References Cited

U.S. PATENT DOCUMENTS

| | | | | |
|---|---|---|---|---|
| 3,778,086 A | * | 12/1973 | Moore et al. | 280/851 |
| 6,079,769 A | | 6/2000 | Fannin et al. | |
| 7,871,121 B1 | | 1/2011 | Ragsdale | |
| 8,366,180 B2 | * | 2/2013 | Lee et al. | 296/180.4 |

* cited by examiner

*Primary Examiner* — Dennis H Pedder
(74) *Attorney, Agent, or Firm* — Ralph E Smith

(57) ABSTRACT

An air dam for a semi-truck tractor in accordance with an aspect of the present disclosure includes a rigid upper panel affixed to a bumper of the semi-truck tractor and a lower flexible panel affixed to the upper panel.

9 Claims, 4 Drawing Sheets

FRONT AIR DAM FOR TRUCK

CROSS-REFERENCE TO RELATED APPLICATIONS

This application claims the benefit of U.S. Provisional Application No. 61/670,153 filed on Jul. 11, 2012. The entire disclosure the above application is incorporated herein by reference.

FIELD

The present invention relates to air dams for trucks.

BACKGROUND

Air dams, which are sometimes called spoilers, can be mounted to the lower front bumpers of vehicles such as trucks to reduce the amount air passing beneath the vehicle. This reduces aerodynamic air drag and helps increases fuel economy.

These air dams are typically relatively rigid. This can result in damage to the air dam due to the bottom of the air dam impacting the road surface, such as may occur when the truck passes over bumps in the road at speed.

SUMMARY

An air dam for a semi-truck tractor in accordance with an aspect of the present disclosure includes a rigid upper panel affixed to a bumper of the semi-truck tractor and a lower flexible panel affixed to the upper panel.

In accordance with an aspect of the present disclosure, a plurality of stiffeners are fastened to inner sides of the upper panel and lower flexible panel and bridge across the upper panel and lower flexible panel. In an aspect, the stiffeners are more rigid than the lower flexible panel and stiffen the lower flexible panel. In accordance with an aspect of the present disclosure, each stiffener is E-shaped with a base of the E attached to the lower flexible panel and legs of the E attached to the upper panel.

In accordance with an aspect of the present disclosure, each E-shaped stiffener includes a center leg and outer legs having outer edges that are even with ends of the base of the stiffener.

In accordance with an aspect of the present disclosure, the E-shaped stiffeners include outboard stiffeners and a center stiffener, each outboard stiffener including a center leg, an outer leg and an inner leg, the outer leg having an outer edge even with an outer edge of the base of the stiffener and the inner leg having an outer edge inboard of an inner edge of the base of the stiffener, the center stiffener including a center leg and left and right legs, the left and right legs having outer edges that are inboard of left and right edges of the base of the stiffener.

In accordance with an aspect of the present disclosure, the stiffeners include rectangular strips disposed at right and left edges of the air dam.

In accordance with an aspect of the present disclosure, the lower flexible panel is a sheet of reinforced rubber belting.

In accordance with an aspect of the present disclosure, the upper panel is a section of galvanized sheet metal shaped to follow the contour of the bumper of the semi-truck trailer.

In accordance with an aspect of the present disclosure, the upper panel has a vertical section and a top horizontal lip that extends inwardly from the vertical section wherein the lip is affixed to a bottom of the bumper. In accordance with an aspect of the present disclosure, lip includes a plurality of slices therein that facilitate contouring of the upper panel to the bumper.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
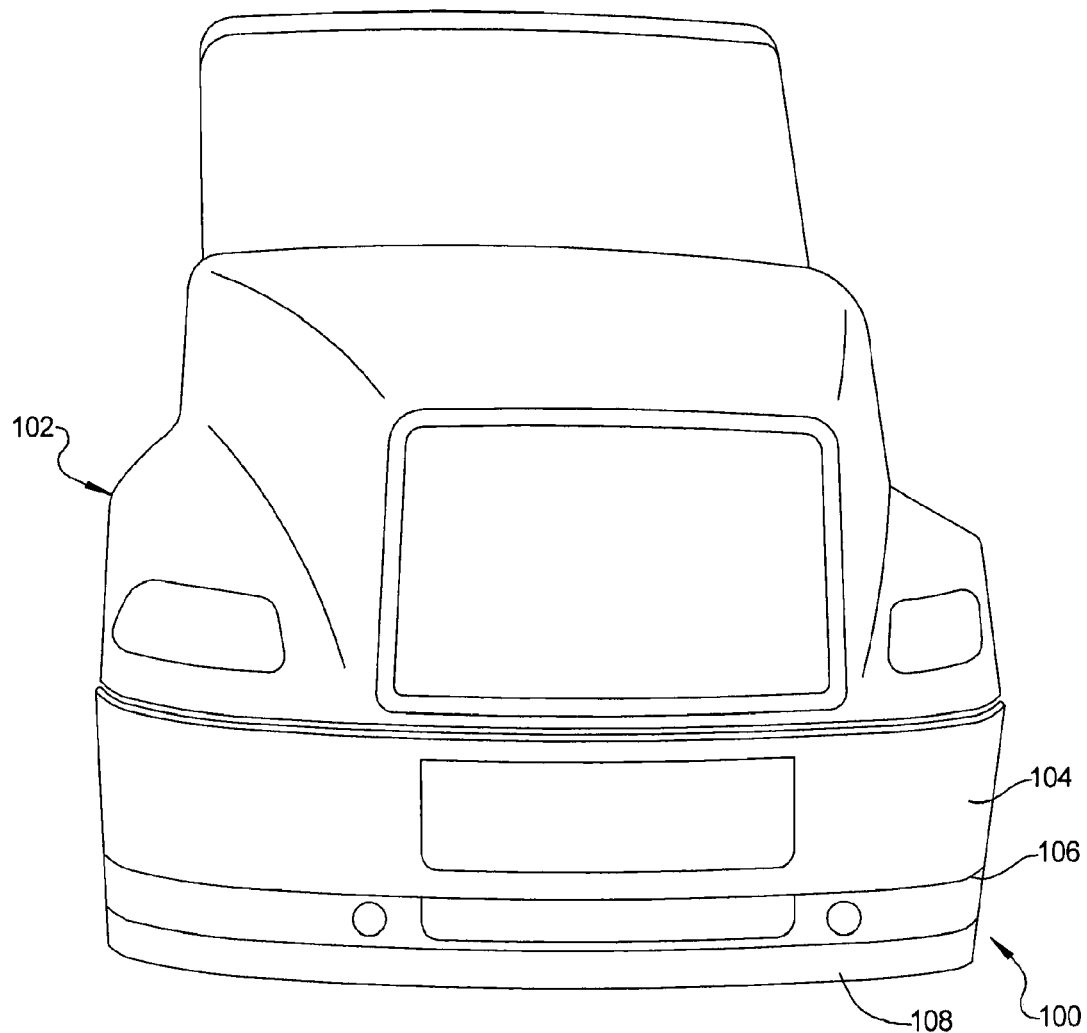
FIG. 1 is a front perspective view of a truck with a front air dam in accordance with an aspect of the present disclosure.

With reference to the drawings, an air dam 100 for a semi-truck tractor 102 is shown. The air dam 100 is shown in FIG. 1 mounted to the front bumper 110 (FIG. 2) of the semi-truck tractor 102. Air dam 100 extends from a lower edge 106 of the front facia 104 of the semi-truck tractor 102 to a short distance above a road surface such as of a road on which the semi-truck tractor is travelling. A lower edge 108 of air dam 100 may for example be about four inches above the road surface. Air dam 100 thus reduces the air gap between the lower edge 106 of the front facia 104 of semi-truck tractor 102 from about fifteen inches to about four inches.

Figure 2:
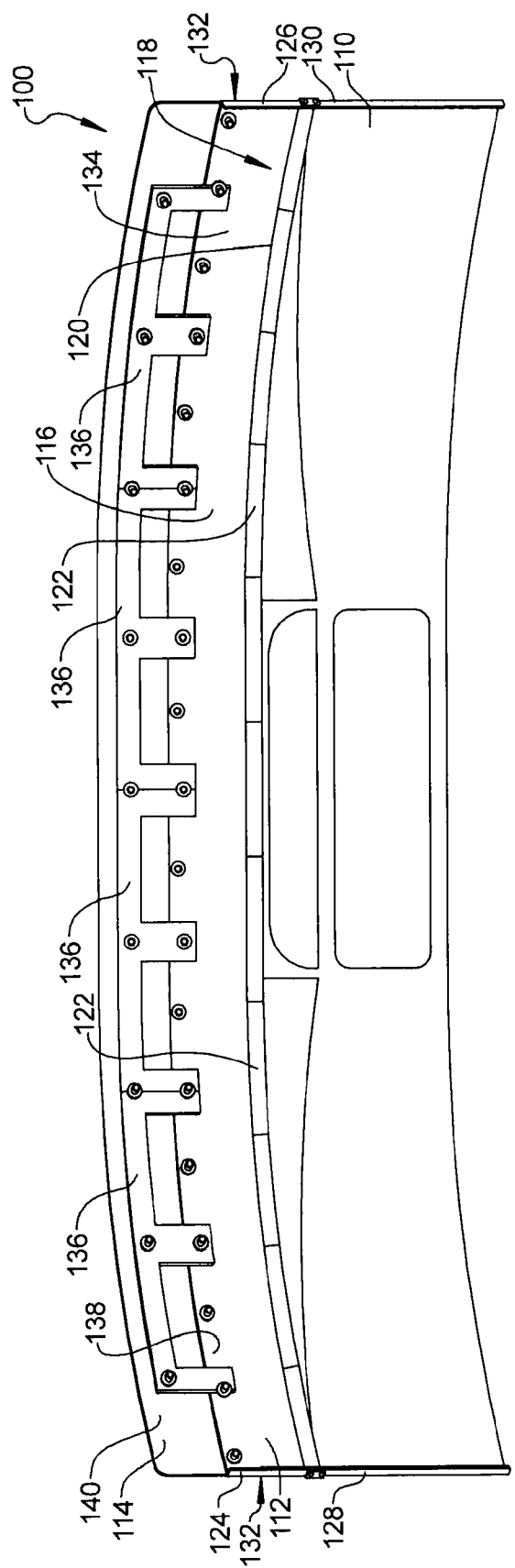
FIG. 2 is an inverted perspective view of an inner side of the air dam of FIG. 1.
Figure 3:
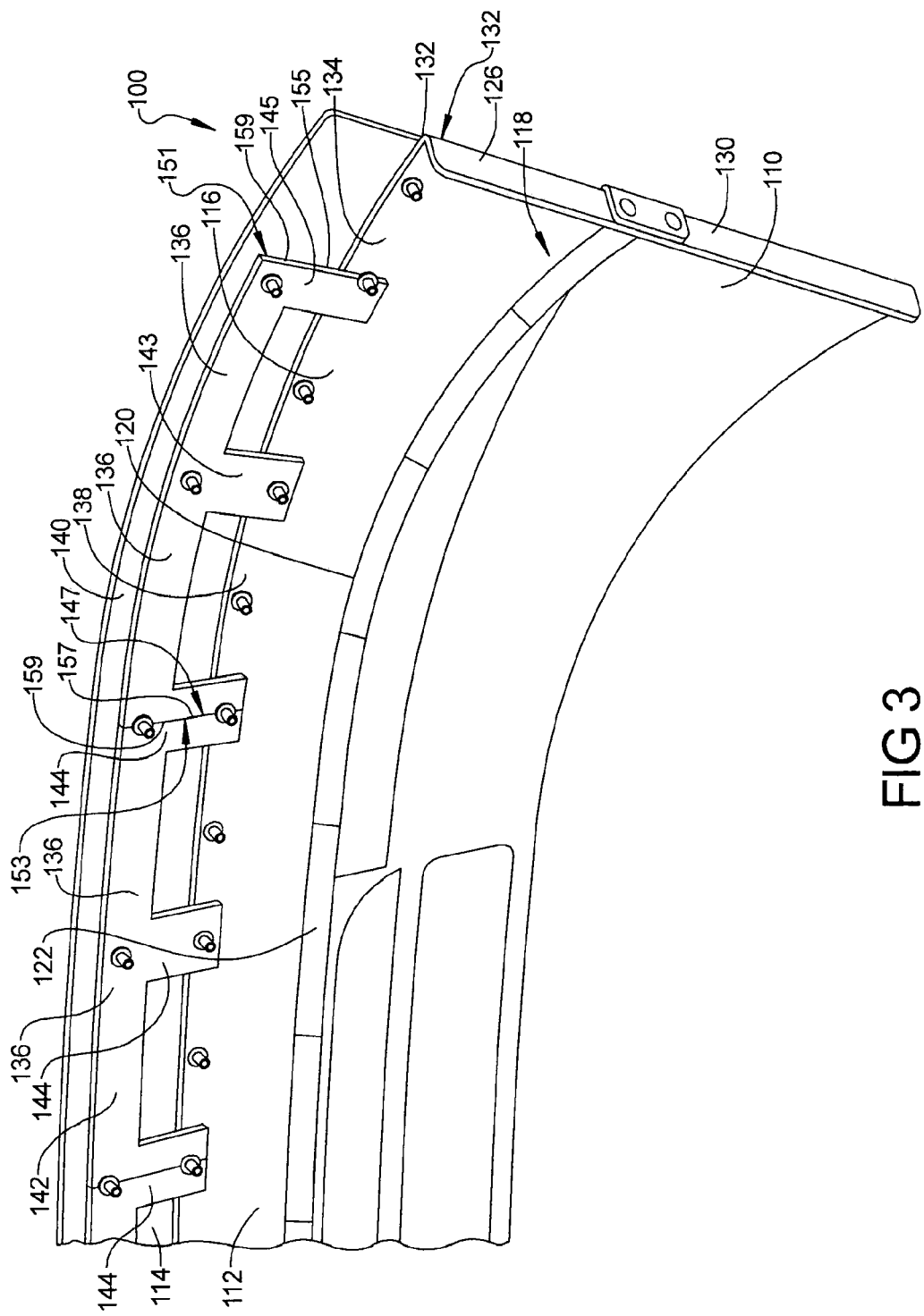
FIG. 3 is an inverted perspective view of an inner right side of the air dam of FIG. 1.

FIGS. 2 and 3 show air dam 100 in more detail from the perspective of an inner side of air dam 100 in an inverted position. That is, bumper 110 is on the bottom and air dam 100 is on the top extending upwardly from bumper 110. It should be understood, however, terms such as "upper" and "lower" are with reference to air dam 100 installed to semi-truck tractor 102 in its normal orientation as shown in FIG. 1 with air dam 100 extending downwardly from front facia 104 of semi-truck tractor 102.

Air dam 100 is formed to follow the contour of bumper 110 of semi-truck tractor 102 and has a width comparable to the width of bumper 110. Air dam 100 includes an upper panel 112 and a lower, flexible panel 114. Upper panel 112 may illustratively be a rigid panel and may be for example a section of galvanized sheet metal shaped to follow the contour of bumper 110 of semi-truck tractor 102. Upper panel 112 may for example be 18 gauge galvanized sheet metal. Upper panel 112 may alternatively be made of molded fiberglass or plastic. Upper panel 112 has a vertical section 116 and a top horizontal lip 118 that extends inwardly from vertical section 116. Lip 118 butts up against a bottom 120 of bumper 110 and is attached to bottom 120 of bumper 110 such as with bolts (not shown). Lip 118 may have a plurality of slices 122 therein to facilitate the contouring of upper panel 112 to bumper 110. By way of example and not of limitation, slices 122 may be spaced about every three inches in lip 118 in those areas where upper panel 112 curves to conform to the contour of bumper 110, such as in sections that are right and left of a center section. Left and right edges 124, 126 of upper panel 112 are bent inwardly to wrap around left and right edges 128, 130 of bumper 110.

Lower flexible panel 114 may illustratively be a sheet of reinforced rubber belting and is attached to upper panel 112. The reinforced rubber belting may for example be ⅛ inch thick. In an example, an upper section 132 of lower flexible panel 114 overlaps a lower section 134 of upper panel 112, such as by about one inch, and these overlapping sections are bolted together by a plurality of bolts spaced along these overlapping sections. In an example, the bolts may be spaced every six inches. Should lower flexible panel 114 become worn, it can be replaced with a new lower flexible panel 114.

A plurality of stiffeners 136 may be fastened to inner sides 138, 140 of upper panel 112 and lower flexible panel 114, respectively and bridge across upper panel 112 and lower flexible panel 114. In an aspect, stiffeners 136 have more rigidity than lower flexible panel 114 and stiffen lower flexible panel 114. Stiffeners 136 may illustratively be sections of a mud flap, such as used on semi-truck tractors. With specific reference to FIG. 3, these stiffeners may be E-shaped with a base 142 of the E attached to lower flexible panel 114 and legs 144 of the E attached to upper panel 112. The base 142 of the stiffeners may for example be thirty inches wide with the center leg 143 being three inches wide and the outer legs (right leg 145 and left leg 147) being one and one-half inches wide. Right and left legs 145, 147 are at opposed ends 151, 153 of stiffener 136 with outer edges 155, 157 the right and left legs 145, 147, respectively, even with opposed ends 159 of base 142. Base 142 may have a height of one and one-half inches. Each leg 144 may be four inches long.

Figure 4:
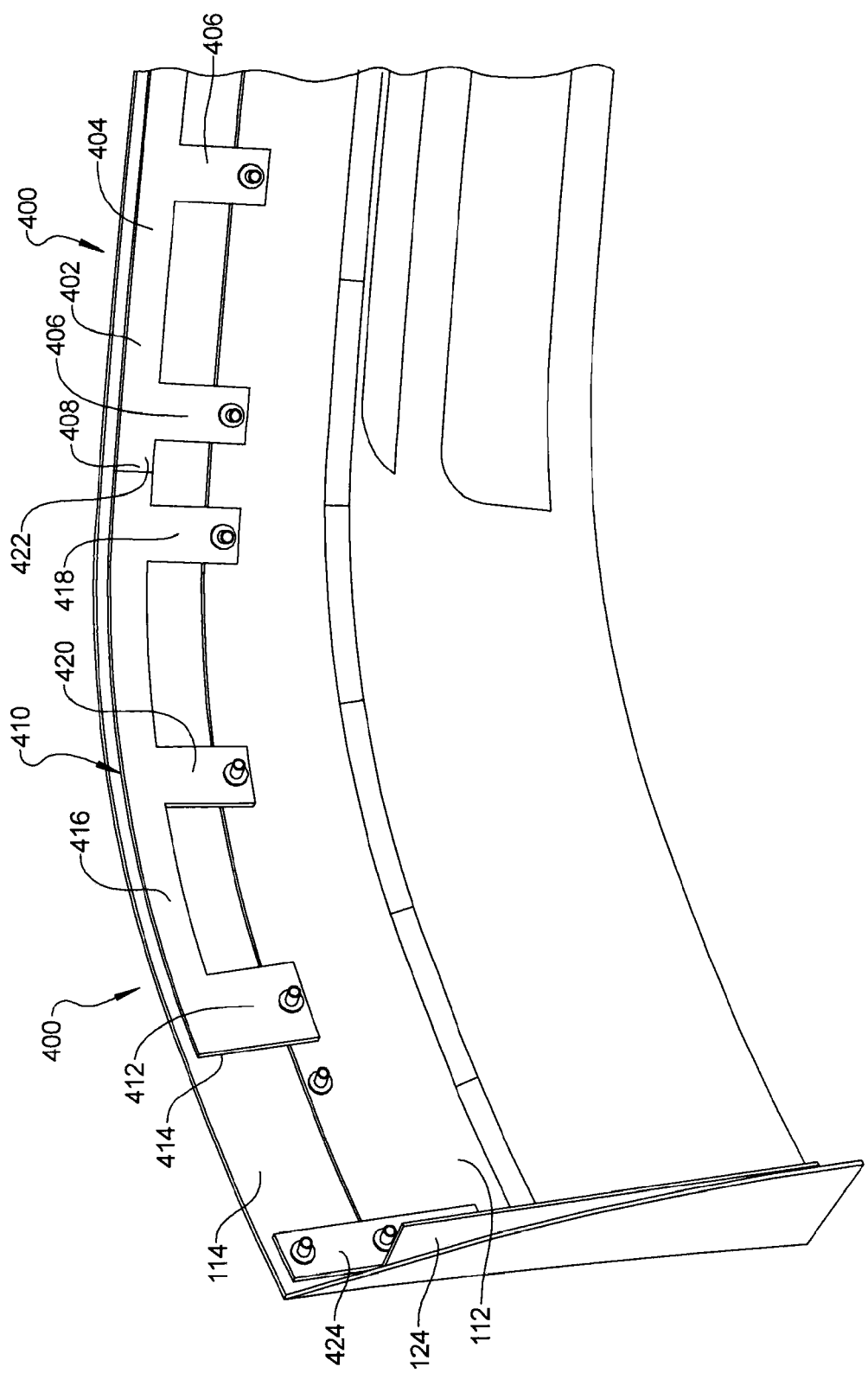
FIG. 4 is an inverted perspective view of an inner left side of the air dam of FIG. 1.

FIG. 4 shows a variation of the stiffeners, designated 400. Stiffener's 400 are also E-shaped having a base and three legs. Illustratively, three stiffeners 400 may be used. The centermost stiffener, stiffener 404 in FIG. 4, has outboard legs 406 (only one of which is shown in FIG. 4) spaced inwardly from opposed ends 408 (only one of which is shown in FIG. 4) of base 402. For example, outboard legs 406 may be three inches wide and have a centerline that is 3½ inches inboard of the respective end 408. Center leg 406 may also be three inches wide. The outboard stiffeners, only one of which is shown in FIG. 4 and designated as stiffener 410, has outermost leg 412 that has an outer side that is even with outer end 414 of base 416 of stiffener 410. Outermost leg 412 may illustratively be five inches wide. Innermost leg 418 and center leg 420 may each illustratively be three inches wide. Innermost leg 418 has a centerline that is 3½ inches inboard of inner end 422 of base 416. The outboard stiffener not shown in FIG. 4 is a mirror image of outboard stiffener 410. A stiffener 424 (only one of which is shown in FIG. 4) may also be provided adjacent left and right edges 124, 126 of upper panel 112 and that also bridge across upper panel 112 and lower flexible panel 114, and may illustratively be rectangular strips.

The upper panel 112 may have a height of about six inches and the lower flexible panel may have a height of about six and one-half inches. Air dam 100 reduces the effective of aerodynamic drag caused by air passing under the vehicle. Lower flexible lower panel 114 yields when contacted such as by ramps, pot holes, or the like. Also, flexible lower panel 114 can be unbolted from upper panel 112 and replaced when flexible lower panel 114 becomes worn.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air dam for a semi-truck tractor, comprising:
a rigid upper panel affixed to a bumper of the semi-truck tractor and a lower flexible panel affixed to the upper panel; and
a plurality of stiffeners fastened to inner sides of the upper panel and lower flexible panel and bridging across the upper panel and lower flexible panel, the stiffeners having more rigidity than the lower flexible panel and stiffening the lower flexible panel, the stiffeners including E-shaped stiffeners with a base of the E attached to the lower flexible panel and legs of the E attached to the upper panel.

2. The air dam of claim 1, wherein each E-shaped stiffener includes a center leg and outer legs, the outer legs having outer edges that are even with respective ends of the base of the stiffener.

3. The air dam of claim 1, wherein the E-shaped stiffeners include outboard stiffeners and a center stiffener, each outboard stiffener including a center leg, an outer leg and an inner leg, the outer leg having an outer edge even with an outer edge of the base of the stiffener and the inner leg having an outer edge inboard of an inner edge of the base of the stiffener, the center stiffener including a center leg and left and right legs, the left and right legs having outer edges that are inboard of left and right edges of the base of the stiffener.

4. The air dam of claim 3, wherein the stiffeners include rectangular strips disposed at right and left edges of the air dam.

5. The air dam of claim 1 wherein the lower flexible panel is a sheet of reinforced rubber belting.

6. The air dam of claim 1 wherein the upper panel is a section of galvanized sheet metal shaped to follow the contour of the bumper of the semi-truck trailer.

7. The air dam of claim 1 wherein the upper panel has a vertical section and a top horizontal lip that extends inwardly from the vertical section wherein the lip is affixed to a bottom of the bumper.

8. The air dam of claim 7 wherein the lip includes a plurality of slices therein that facilitate contouring of the upper panel to the bumper.

9. The air dam of claim 8 wherein the lower flexible panel is a sheet of reinforced rubber belting.

* * * * *